United States Patent [19]

Ross, III et al.

[11] Patent Number: 4,660,337
[45] Date of Patent: Apr. 28, 1987

[54] GRAIN STORAGE UNIT AND METHOD OF USE THEREOF

[75] Inventors: Lent A. Ross, III; Thurman L. Boykin, both of Clarksdale, Miss.

[73] Assignee: Advanced Storage, Inc., Clarksdale, Miss.

[21] Appl. No.: 830,372

[22] Filed: Feb. 18, 1986

[51] Int. Cl.$^4$ ............................................. E04H 7/00
[52] U.S. Cl. ........................................ 52/192; 52/3; 52/63; 52/23
[58] Field of Search ............... 52/63, 3, 4, 23, 169.6, 52/169.7, 169.8, 198, 192, 80, 81

[56] References Cited
U.S. PATENT DOCUMENTS

| | | | |
|---|---|---|---|
| 234,185 | 11/1880 | Hendrick | 52/169.7 |
| 2,888,717 | 6/1959 | Domitrovic | 52/3 |
| 3,103,083 | 9/1963 | Seeger | 52/3 X |
| 3,182,582 | 5/1965 | Beach | 52/3 |
| 3,727,656 | 4/1973 | Luders | 52/3 X |
| 4,121,389 | 10/1978 | Ptaszek | 52/192 X |
| 4,224,770 | 9/1980 | Petty | 52/192 X |

FOREIGN PATENT DOCUMENTS

| | | | |
|---|---|---|---|
| 2939301 | 4/1981 | Fed. Rep. of Germany | 52/3 |
| 2045 | 1/1977 | Japan | 52/192 |

*Primary Examiner*—William F. Pate, III
*Assistant Examiner*—Naoko N. Slack
*Attorney, Agent, or Firm*—Kenyon & Kenyon

[57] ABSTRACT

Grain storage is provided by a unit having a above-ground retaining wall structure, a floor liner and a cover liner. The wall structure is preferably formed from an earthwork berm and typically has a generally rectangular shape having two parallel side walls and at least one end wall. The area enclosed by the retaining wall structure is covered with a floor liner member on top of which the grain may be deposited. As the area is being filled, the grain is covered with the cover liner. After the unit is completely filled and covered the floor and cover liners are sealed together to form an airtight grain storage compartment in which the grain may be maintained for long periods of time. After sealing the liner together the excess air trapped within the grain storage compartment is preferably removed and the sealed edges of the floor and cover liners are buried in a trench provided around the outside of the retaining wall structure.

8 Claims, 9 Drawing Figures

GRAIN STORAGE UNIT AND METHOD OF USE THEREOF

This invention relates to a method and unit for storing and preserving grain materials. More specifically this invention relates to a flexible membrane storage unit which is easy to assemble and which is suitable for short or long term storage of grain and a method of use thereof.

BACKGROUND OF THE INVENTION

The traditional structure employed in storing grain such as wheat, corn, soybean, rice, milo and the like have been silos, grain storage bins, grain elevators and other such storage units, within which the grain may be deposited and maiantained. However, the use of these traditional storage units has several drawbacks.

The capital outlay for the construction of a storage bin is quite high and construction time is relatively long. In this day of low farm product prices and unsure markets for farm products, many grain producers and handlers are unwilling or unable to commit the necessary funds to construct a grain storage bin. In addition the typical grain handler is not equipped to build a grain storage bin and therefore, must contract for labor and equipment to construct the storage bin.

Furthermore, fires and explosions in a grain-filled storage bin are ever present dangers. Substantial amounts of grain dust are typically present within a storage bin. If the grain dust gets hot enough or if a spark is generated by associated equipment, there may be an explosion and fire in the storage bin of sufficient force to destroy the storage bin and its contents.

As mentioned above, areas of elevated temperature develop within grain containing storage bins. In addition, pockets of moisture are often found within the storage bin. To prevent damage to the grain caused by these conditions, provisions must often be made within the storage bin for air movement to adjust moisture levels and regulate the temperature within the storage bin.

In addition, the grain odor which emanates from a grain containing storage bin often attracts insects and rodents which can survive for long periods of time within the storage bin due to the abundance of food and air available therein.

Finally, access to the grain at different levels within the storage bin for inspection is difficult.

A general discussion of the storage of grain in an oxygen depleted atmosphere may be found in "Controlled Atmosphere Storage" by M. B. Hyde and N. J. Burrell in *Storage of Cereal Grains and Their Products*, edited by C. M. Christensen (American Association of Cereal Chemists, Inc., St. Paul, Minnesota 1982) pages 443–478.

Examples of alternate long term grain storage systems may be found in Yates, C. G. and Pasley, K. M., "The Development of Low Cost Storage and Handling systems;" AGRISTORE sales literature; "Description of PVC Covered Concrete Walled Temporary Stores" published by the Australian Wheat Board; and "AGRISTORE Flexible Membrane Storage" - description of the AGRISTORE storage system. The present invention is an improvement to such prior systems.

It is therefore an object of the present invention to provide a grain storage unit and method of use thereof which is easily constructed without large expenditures of capital or time.

It is another object of the present invention to provide a storage unit and method of use thereof which provides long term storage of the grain without insect or rodent infestation, without degradation of the grain quality and with a substantially reduced risk of grain dust explosions.

It is still another object of the present invention to provide such a unit and method which provides easily access to the stored grain.

SUMMARY OF THE INVENTION

These and other objects are accomplished by a flexible membrane storage unit comprised of an aboveground retaining wall structure formed on a flat surface (e.g. a field, platform or the like) which encloses an area within which grain may be deposited, a first water proof, puncture resistant liner overlaying the enclosed area and forming the floor of the storage unit on which grain may be deposited and a second water proof, ultraviolet light deterioration resistant liner which covers the grain deposited within the enclosed area, the floor and cover liners being sealed together along their periphery to provide an air tight grain storage compartment in which the grain may be stored and maintained for substantial periods of time.

The sealed periphery of the top and bottom liners is preferably buried along the outside of the retaining wall structure to prevent wind lift of the grain storage compartment and to protect the wall structure from weather damage.

In a preferred embodiment of the present invention, the retaining wall structure is provided with an open end through which grain and grain handling equipment may pass into and out of the enclosed area. Most preferably the retaining wall structure is a generally rectangular structure with two parallel side walls and one end wall.

The storage structure of the present invention may also, by use of a pump means, have any excess air trapped within the grain storage compartment evacuated such that this evacuation, in combination with the natural respiration of the grain (i.e., consumption of oxygen and production of carbon dioxide) forms an oxygen-depleted atmosphere within the grain storage compartment.

DETAILED DESCRIPTION OF THE INVENTION

Figure 1:
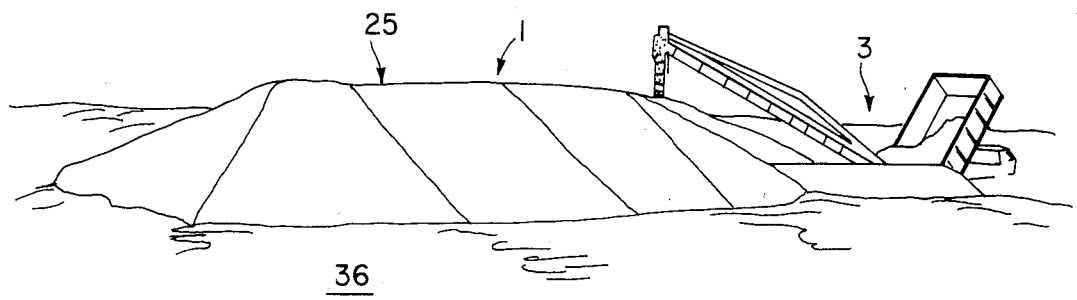
FIG. 1 is a perspective view of the grain storage unit of the present invention.
Figure 2:
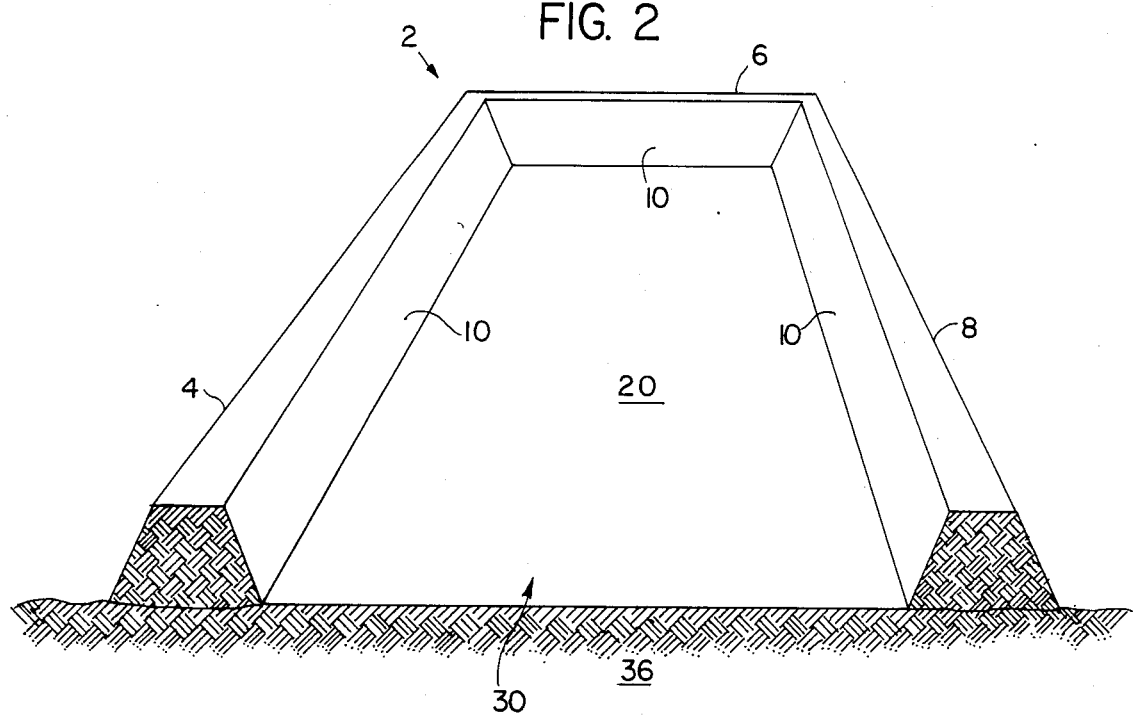
FIG. 2 is a perspective view of the preferred retaining wall structure of the present invention.

Referring to the figures, the grain storage unit 1 is constructed by forming an above-ground retaining wall structure 2 on a suitable flat surface 36, the wall structure 2 enclosing an area 20. The flat surface on which the retaining wall structure 2 is constructed may be a platform made from materials such as wood or concrete but is preferably a farm field or the like. It will be clear to one skilled in the art that the retaining wall structure 2 be layed out in a multitude of patterns (e.g. circular, square, rectangular, etc.) and the actual shape will be determined by land topography, land size or shape, amount of grain to be stored and the like. However, in the preferred embodiment, the retaining wall structure is comprised of a first side wall 4, a second side wall 8 spaced apart from and positioned parallel to the first side wall 4 and at least one end wall 6 joining the ends of the first and second side walls, 6 and 8, to form one end of the retaining wall structure 2 such that a generally rectangular area 20 is enclosed within which grain may be deposited. A second end wall may be provided at the end of the wall structure 2 opposite end wall 6, thus completely enclosing area 20, however, by providing an opening 30 at one end of wall structure 2 the movement of grain in and out of the area 20 as well as the construction of structure 2 itself will be facilitated.

The area 20, which will typically be bare earth is overlayed with a floor liner 18. The liner 18, upon which the grain is deposited, is waterproof and puncture resistant and will form the bottom of the storage unit protecting the grain from water damage and contamination from the soil below. Liner 18 is sized to extend the entire length and width of surface 20 and to extend up and over retaining wall structure 2.

After liner 18 has been layed over surface 20, the grain to be stored in storage unit 1 may be deposited thereon. The storage unit will typically be filled by dumping the grain to be stored into an auger or grain thrower located within area 20 midway between side walls 4 and 8. The grain 26 is deposited along the entire length of the enclosed area 20 starting at the end adjacent to end wall 6 and progressing towards the open end 30 of the retaining wall structure 2.

As the grain is deposited upon floor liner 18 within the wall structure 2 in area 20 it is covered with cover liner 16 which serves to protect the deposited grain from inclement weather experienced as the storage unit is being filled. As more grain is added the cover line 16 is extended thereover. Liner 16 is sized so that when the entire storage unit is filled, the cover liner 16 extends over the entire grain stack 26 and down the outside of retaining wall structure 2 where it overlays the periphery of floor liner member 18 which as described above also extends over retaining wall structure 2. The cover liner 16 and floor liner 18 may then be sealed together at point 22 along their periphery (i.e., where they overlay each other) to provide an air tight, sealed grain storage compartment 25 within which the grain is maintained.

Figure 7:
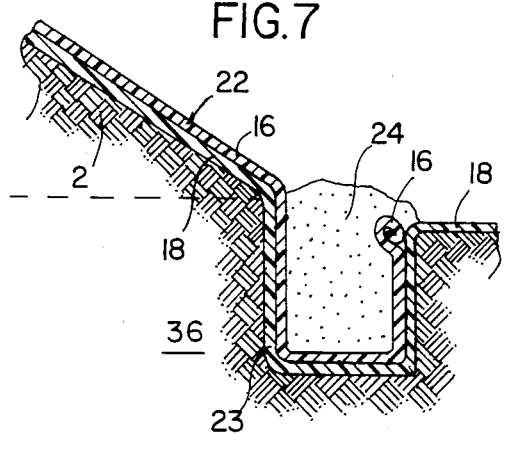
FIG. 7 is an expanded view of one method of securing of the sealed periphery of the storage unit.
Figure 8:
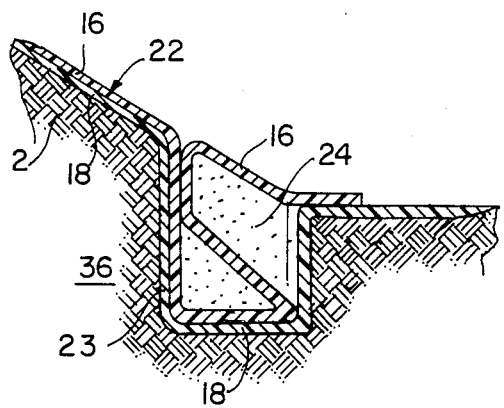
FIG. 8 is an expanded view of an alternate method of securing the sealed periphery.

The peripheral sealed edge of liners 16 and 18 may be left resting on the outside of wall structure 2. However, in a preferred embodiment the edges are buried in a trench 23 provided along the outside of the wall structure 2. The peripheral edge of the liners 16 and 18 is placed in trench 23 and covered with a portion of earth 24. Burying the peripheral edge enhances the air tight characteristics of the storage unit 1, prevents windlifting of the storage compartment 25 and inhibits deterioration of the wall structure 2 caused by exposure of the structure to the elements. In one burial configuration (FIG. 7) the edge of both the floor and cover liners 16 and 18, respectively, are maintained in an overlayed relationship to each other and line the sides and bottom of trench 23. A portion of earth 24 is then deposited over the overlayed liner edges. However, in a preferred configuration (FIG. 8), the edge of floor liner 18 lines the sides and bottom of trench 24 while the edge of cover liner 16 doubles back through earth portion 24 and emerges therefrom at a location adjacent to where the liner edges initially entered the trench 23. This configuration is preferred as it inhibits erosion of earth portion 24 by the elements and therefore more securely fixes the edges of the liner and consequently the grain containing bunker 25 itself.

The retaining wall structure 2 employed in the present invention may be formed from any suitable construction material (concrete, wood and the like). However, the structure is preferably formed from earthwork berms. The berms are typically formed from earth scraped from on and around the site on which the storage unit is to be located and may be formed with any suitable earth moving equipment or even by hand. Earthwork berms are preferred due to the ease of construction, and the minimal equipment and skill level requirements and because the height of the berms may be easily increased.

Figure 3:
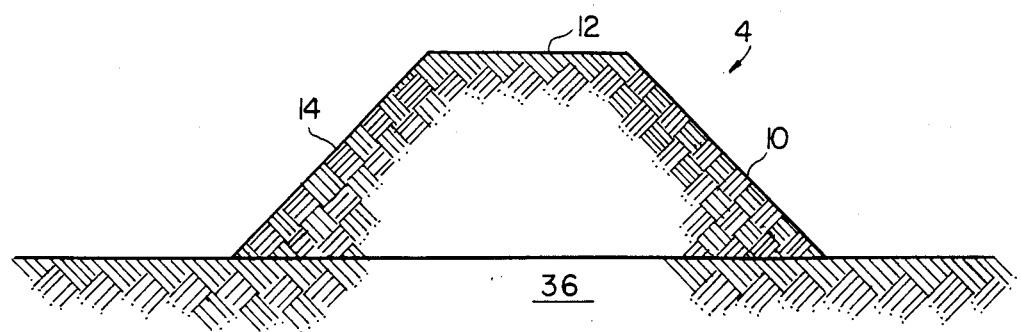
FIG. 3 is a cross-sectional view of the wall structure of FIG. 2.
Figure 4:
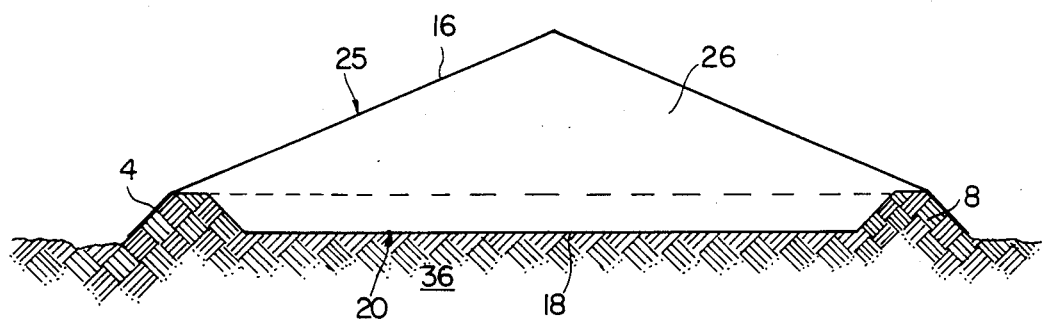
FIG. 4 is a cross-sectional schematic of the unit of FIG. 1.
Figure 5:
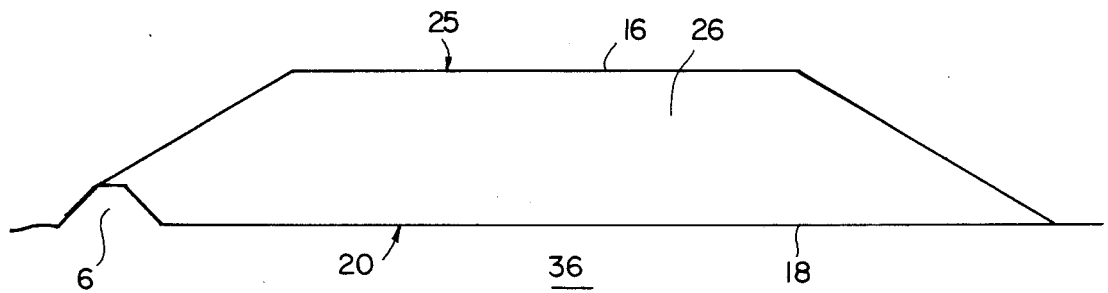
FIG. 5 is a longitudinal schematic of the unit of FIG. 1.
Figure 6:
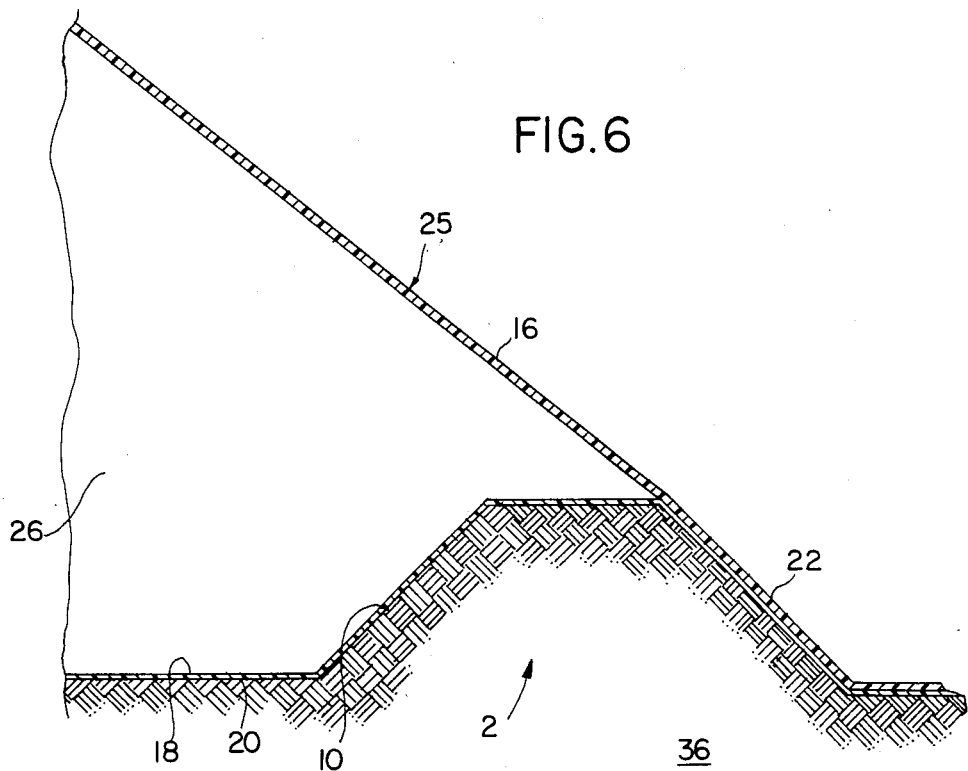
FIG. 6 is a cross-sectional view of a portion of the unit of FIG. 1 along one of the retaining wall members.

The earthwork berms have a generally trapozoidal cross-section (see FIG. 3) and are typically three feet high, three feet wide at the top and nine feet wide at the bottom and are comprised of a top face 12, a first side face 10 oriented into area 20 and a second side face 14 forming the outside wall surface. However, as will be discussed below, the actual height of the walls employed will be a function of the amount of grain to be stored. The inside berm wall 10 which faces into area 20 preferably slopes at approximately a 45° angle from horizontal.

The floor and cover liners, 18 and 16 respectively, employed in the present invention are formed from a high tensile strength polyvinyl chloride (PVC) containing sheeting material provided as either a PVC sheet material or a PVC-coated woven fabric. The sheeting material is of a suitable thickness to resist punctures caused by foreign objects and forces caused by the grain handling equipment moving on the liners and which will prevent grain odor from escaping from the bunker. The sheeting material is also practically oxygen impermiable. In addition, the liners' (especially the cover liner) should be able to withstand the deteriorating effects of ultraviolet light (one of the components of sunlight) during the expected useful life of the unit.

The liners used for the floor and cover in the present invention may be provided as one piece, however, positioning and laying of the liners will be quite difficult if the storage unit is to be of any useful size. Therefore, it is preferable to construct each of the liners on site from a plurality of smaller panels, each of which is joined to and sealed together with an adjacent panel when it is overlayed on area 20 (in the case of floor liner 18) or as it is positioned over the grain stack 26 (in the case of cover liner 16). These panels typically will have a width of up to 100 ft., their length depending on the desired width of the storage unit, and may be layed out by hand or with the aid of a farm tractor, truck or the like.

The cover and floor liner edges are sealed together using any suitable means which will provide an air tight seal. A suitable bonding solvent or more preferably a PVC welding device such as the Leister-Korbi Triac or the Leister-Variant welder distributed by Trinity Company of Atlanta, Georgia may be used to form the seal. The welding device heats the liner material to a temperature of about 600° F.–800° F. causing it to partially melt. Pressure is then applied to the heated area causing the panels to bond. In addition, the liner edges may be stitched together using a suitable stitching material and stitcher. The individual liner panels may be joined and sealed together in a like manner. To assure a proper seal, adjacent panels should overlap each other at least 1.5".

Figure 9:
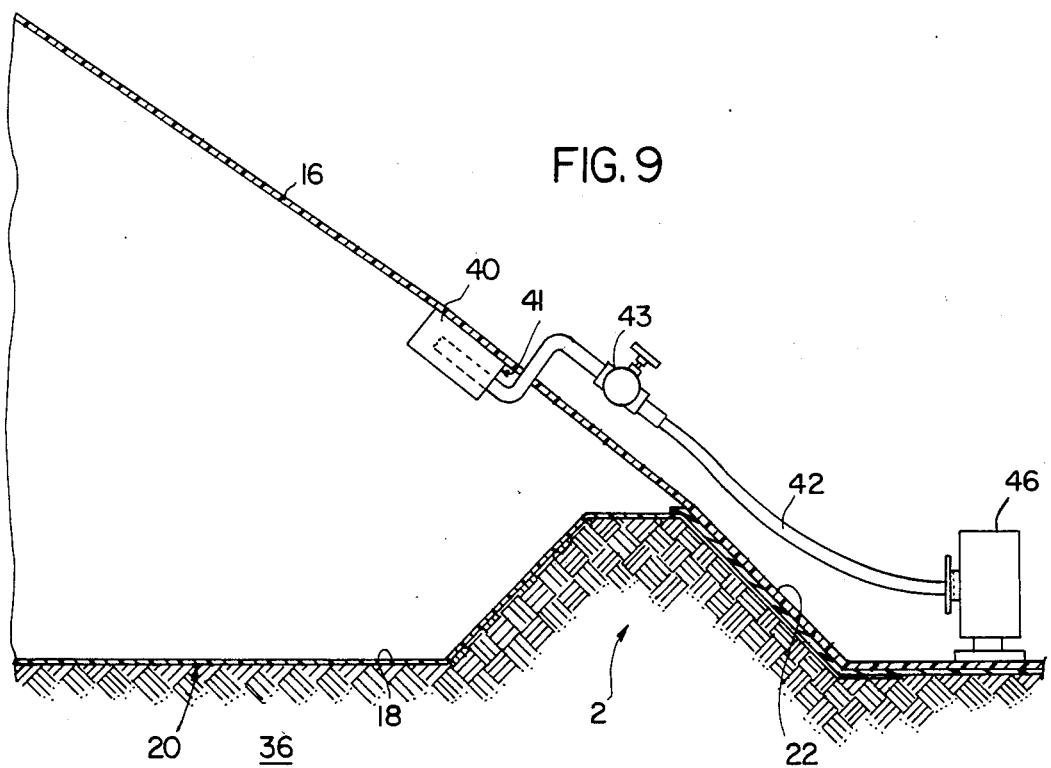
FIG. 9 is a schematic view of the pump means used in the present invention.

As described above, any oxgen-containing air trapped within storage unit of the present invention when it has been sealed is preferably evacuated. This can be accomplished by inserting a spout which is connected to a vacuum pump into bunker 25 in an area between cover liner 16 and grain stack 26 at approximately 24" above the top of retaining wall structure 2. The spout is designed to keep the cover liner 18 from being drawn into the spout thus stopping the air flow and to minimize the removal of grain from the storage compartment 25 during the evacuation process. FIG. 9 shows one possible arrangement of an air evacuation system. A spout 40 comprised of a ribbed cylinder with one open end 41 is provided within the storage compartment 25 between the grain 26 and cover liner 16. Into the open end 41 is inserted hose 42 which is connected to a source of vacuum 44. In addition, the hose may contain a valve 43 for regulating the air flow. Since the spout opening 41 is larger than the hose opening the air flow rate at the spout opening 41 is much less than it will be at the hose opening. Therefore, little or no grain is drawn out of storage compartment 25. In addition, cover liner 16 cannot be drawn over the hose and block the air flow.

The vacuum pump is operated until cover liner 18 is tightly drawn over grain stack 26. This usually takes about 48 hours. At that point the pump is disconnected from the spout and the cover is sealed thereover. Any oxygen remaining within the storage compartment 25 will be consumed by the normal respiration process of the grain. This respiration process also produces carbon dioxide. As a result, within a short period of time, the atmosphere within the storage compartment 25 is almost completely oxygen-depleted and is incapable of supporting rodent or insect life. This fact, coupled with the lack of grain odor passing through the floor and cover liner, virtually elminates any rodent and insect problems.

The fact that cover liner 18 is pulled tightly over the grain stack 26 ensures that little or no wind damage may occur. In addition, there are no air pockets within the evacuated unit to accumulate grain dust or moisture, thus reducing the risk of grain dust explosion and the incidence of localized moisture-induced grain rot.

Access to and inspection of the stored grain is facilitated by the storage unit of the present invention. The grain may be inspected at almost any point within the unit by cutting an opening in the cover liner 18 and removing a sample of the grain. After the sample is taken, a piece of liner material may be sealed over the inspection/sampling hole in a manner similar to the way the liners and liner panels are joined. In addition, temperature sensors may be provided within storage compartment 25 so that temperatures changes therein may be monitored.

Removal of the grain from the storage unit is also a relatively uncomplicated process. To remove the grain, the seal between the floor and cover liner is opened. This may be done at any point along the periphery of the storage unit but is most preferably done at the opening 30 of the retaining wall structure 2. After the required amount of grain is removed the floor and cover liners, 18 and 16 respectively, are resealed and any excess that has leaked into the unit may be removed, thus re-establishing the air tight, oxygen-depleted condition within the storage unit.

In determining the size of the storage unit to be constructed, the height to which the available grain handling equipment can stack the grain must first be determined. To obtain the maximum advantages of the present invention this height should be at least fourteen feet. After determining this height, the width of the unit can be determined from the fact that on average grain will form a heap with an angle of repose of about 23° from horizontal (e.g., corn-21°, wheat-28°). The length of the unit will be a function of the total cubic feet of grain to be stored. As discussed above, the actual height and width of retaining wall structure 2 may also be determined from the desired height of the stack (i.e., the weight of grain that must be supported by the walls). These dimensions can be determined using well-known force balancing equations as well as data on the structural strength of the wall construction material.

The site on which the storage unit is to be built is ideally a relatively flat area. Preferably the water table in the area on which the storage unit is to be built is not close to the surface. Access to the site by trucks and other handling equipment should also be considered. The area should be cleared of vegetation and foreign objects (rocks, tree limbs, etc.) prior to construction and if possible, the floor of the storage unit should be above the surrounding ground level so that water runs away rather than towards the unit.

While the storage unit of the present invention has been described in relation to the storage of bulk grain materials, it will be clear to one skilled in the art that the unit may be used for storage of equivalent materials and may even be used to store bagged as well as the bulk material. The use of the present storage unit for these materials is therefore within the spirit of the present invention which is defined only by the following claims.

What is claimed is:

1. A unit for storage of grain comprising:
   an above-ground retaining wall structure, formed on a substantially flat surface, the wall structure enclosing an area within which the grain may be deposited;
   a first liner member overlaying the area enclosed within the wall structure to form a floor therein, the edges of said first liner member extending out of the said area and over said wall structure;
   a second liner member overlaying the grain deposited on said floor to form a cover thereover, the periphery of said second liner member being bonded to the periphery of said first liner to form an airtight grain storage compartment within which the grain is maintained;
   a spout provided within the grain storage compartment between the grain and the cover liner, said spout being designed to minimize grain removal and blockage of the air removal means;

a source of vacuum provided outside the grain storage compartment; and hose connecting the vacuum source and the spout such that the removal of the air in combination with the natural respiration of the grain itself provides an oxygen-depleted atmosphere within the grain storage compartment wherein the retaining wall structure is comprised of a a first side wall, a second side wall spaced apart from and parellel to said first side wall and at least one end wall joining said first side wall said second wall such that a generally rectangular structure have an open end is formed.

2. The storage unit of claim 1 wherein the wall structure is comrprised of an earthwork berm, said berm having a trapezoidal cross-section, wherein the side of the berm facing into said storage area slopes at an angle of about 45° from horizontal.

3. The storage unit of claim 1 wherein said first and second liner members are formed from polyvinyl chloride containing sheet material having sufficient strength to resist punctures from foreign objects, grain handling equipment and the like and containing sufficient plasticizer to resist ultraviolet light deterioration for the life of the unit.

4. The storage unit of claim 1 wherein the first and second linear members are comprised of a plurality of panels joined together along their adjacent edges.

5. A unit for storage of grain comprising:

an above-ground retaining wall structure, formed on a substantially flat surface, the wall structure enclosing an area within which the grain may be deposited;

a first liner member overlaying the area enclosed within the wall structure to form a floor therein, the edges of said first liner member extending out of the said area and over said wall structure; and a second liner member overlaying the grain deposited on said floor to form a cover thereover, the periphery of said second liner member being bonded to the periphery of said first liner to form an airtight grain storage compartment within which the grain is maintained;

a spout provided within the grain storage compartment between the grain and the cover liner, said spout being designed to minimize grain removal and blockage of the air removal means;

a source of vacuum provided outside the grain storage compartment; and a hose connecting the vacuum source and the spout such that the removal of the air in combination with the natural respiration of the grain itself provides an oxygen-depleted atmosphere within the grain storage compartment.

6. The storage unit of claim 5 whrein the wall structure is comprised of an earthwork berm, said berm having a trapezoidal cross-section, wherein the side of the berm facing into said storage area slopes at an angle of about 45° from horizontal.

7. The stoage unit of claim 5 wherein said first and second liner members are formed from ployvinyl chloride containing sheet material having sufficient strength to resist punctures from foreign objects, grain handling equipment and the like and containing sufficient plasticizer to resist ultraviolet light deterioration for the life of the unit.

8. The storage unit of claim 5 wherein the first and second liner members are comprised of a plurality of panels joined together along their adjacent edges.

* * * * *